(12) United States Patent
Kim et al.

(10) Patent No.: US 8,325,132 B2
(45) Date of Patent: Dec. 4, 2012

(54) METHOD AND APPARATUS FOR DISPLAYING STATE OF APPARATUS

(75) Inventors: Bo-mi Kim, Yongin-si (KR); Min-jeong Moon, Seongnam-si (KR); Jung-won Lee, Seongnam-si (KR); Joon-kyu Seo, Seoul (KR); Hee-jeong Bae, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1248 days.

(21) Appl. No.: 12/043,350

(22) Filed: Mar. 6, 2008

(65) Prior Publication Data

US 2009/0027331 A1    Jan. 29, 2009

(30) Foreign Application Priority Data

Jul. 24, 2007   (KR) .................. 10-2007-0074096

(51) Int. Cl.
*G09G 5/00*    (2006.01)

(52) U.S. Cl. ........................................ 345/156; 715/700
(58) Field of Classification Search ........... 345/156–173
See application file for complete search history.

(56) References Cited

U.S. PATENT DOCUMENTS 7,260,604 B2 *  8/2007  Kuki ............................ 709/205
7,304,753 B1 * 12/2007  Richter et al. ............... 358/1.15

FOREIGN PATENT DOCUMENTS

KR    10-2007-0010415 A    1/2007

* cited by examiner

*Primary Examiner* — Kevin M Nguyen
*Assistant Examiner* — Kenneth B Lee, Jr.
(74) *Attorney, Agent, or Firm* — Sughrue Mion, PLLC

(57) ABSTRACT

A method of displaying a state of an apparatus having a user interface which includes generating state display information indicating the state of the apparatus and displaying the generated state display information in the user interface. The state display information indicates the state of the apparatus through a metaphorical indicator.

20 Claims, 5 Drawing Sheets

METHOD AND APPARATUS FOR DISPLAYING STATE OF APPARATUS

CROSS-REFERENCE TO RELATED PATENT APPLICATIONS

This application claims priority from Korean Patent Application No. 10-2007-0074096, filed on Jul. 24, 2007 in the Korean Intellectual Property Office, the disclosure of which is incorporated herein in its entirety by reference.

BACKGROUND OF THE INVENTION

1. Field of the Invention

Methods and apparatuses consistent with the present invention relate to displaying a state of an apparatus.

2. Description of the Related Art

To check the general state of an electronic device, a user may directly open the device. Alternatively, the user may indirectly check the state of the device by commanding a particular function and monitoring the state of operation of the device according to the command. Examples of the general states of an electronic device include, but are not limited to: whether all functions of the electronic device are properly working; and whether articles or materials used to perform a particular function are sufficiently provided in the device. However, these methods are inconvenient because the user needs to perform a separate job to check the state of the device.

Currently, the user may operate various devices through a variety of user interfaces included in digital devices. However, a problem exists in that the user interface is limited to only delivering a control command by the user to a digital device, and not used for other purposes.

SUMMARY OF THE INVENTION

The present invention provides a method of displaying the state of an apparatus to enable monitoring of the state of the apparatus without performing a separate job by indicating the state of the apparatus on the apparatus, and an apparatus for performing the method.

The present invention also provides a state display method performed in an apparatus in which a user interface is capable of displaying state apparatus information in addition to delivering a user command by displaying the state of the apparatus on the user interface, and an apparatus for performing the method.

According to an aspect of the present invention, a method of displaying a state of an apparatus having a user interface includes: generating state display information indicating the state of the apparatus, and displaying the generated state display information in the user interface, wherein the state display information indicates the state of the apparatus through a metaphorical indicator.

The user interface may include a button.

The state display information of the apparatus may include information indicating a general state of the apparatus, a possibility of performing a particular function by the apparatus, or an amount of material or the number of articles remaining to perform the particular function by the apparatus.

The amount of material or number of articles may be at least one of paper and ink.

The generating of the state display information may include receiving a request to perform a particular function through the user interface, performing the particular function in response to the request, detecting an amount of material or the number of articles remaining after the particular function is performed, and generating the state display information indicating a degree of the remaining amount of material or number of articles in response to the detection.

The remaining amount of material or number of articles may be at least one of the number of remaining papers and the amount of remaining ink.

In the generating of the state display information, the state display information may be generated by extracting state display information corresponding to the detected amount of material or number of articles among state display information that is already stored.

The generating of the state display information may include generating state display information indicating a degree of each remaining amount of material or number of articles when the amount of material or number of articles that is consumed to perform the particular function is plural.

The generating of the state display information may include receiving a request to perform a particular function through the user interface, accumulating the number of requests to perform the particular function, and generating state display information indicating the accumulation number.

The apparatus may include a plurality of user interfaces, and a request to perform a particular function is made through each user interface.

The generating of the state display information may include assigning an order according to the accumulation number by comparing the accumulation number with an accumulation number to perform another function, and generating state display information indicating assigned order.

In the generating of the state display information, the state display information may be generated by extracting state display information corresponding to the accumulation number of request to perform the particular function among state display information that is already stored.

According to an aspect of the present invention, an apparatus for displaying a state includes a state display information processing portion generating state display information by displaying a state of the apparatus through a metaphorical indicator, and a user interface outputting the generated state display information.

BRIEF DESCRIPTION OF THE DRAWINGS

The above and other aspects of the present invention will become more apparent from the following detailed descriptions of exemplary embodiments thereof with reference to the attached drawings in which.

DETAILED DESCRIPTION OF EXEMPLARY EMBODIMENTS OF THE INVENTION

Figure 1:
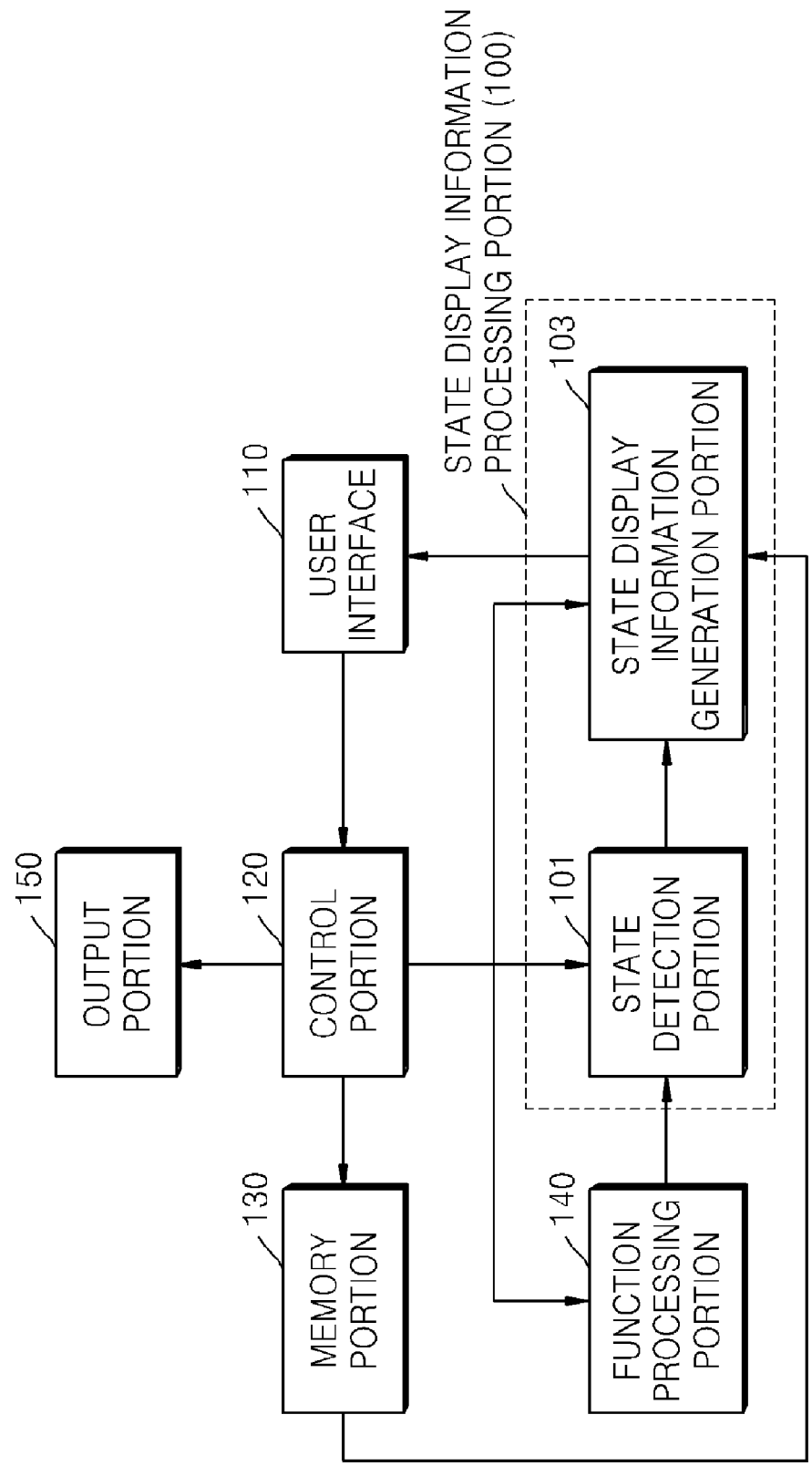
FIG. 1 is a block diagram of an apparatus for performing a state display method according to an exemplary embodiment of the present invention.

FIG. 1 is a block diagram of an apparatus for performing a state display method according to an exemplary embodiment of the present invention. In an exemplary embodiment of the present invention, all digital devices having a user interface may be the apparatus for performing a state display method.

Referring to FIG. 1, the apparatus for performing a state display method according to an exemplary embodiment includes a state display information processing portion 100, a user interface 110, a control portion 120, a memory portion 130, a function processing portion 140, and an output portion 150. The state display information processing portion 100 detects the state of an apparatus and generates state display information according to the detected state of the apparatus, wherein the state display information includes information indicating the state of each of a plurality of constituent elements included in an apparatus or the total state of an apparatus including all constituent elements. When the apparatus is a multi-functional apparatus capable of performing various functions, the state display information may include information indicating whether each function of the apparatus can be performed, or a degree of capability. For example, when the apparatus is a multi-functional apparatus capable of performing functions such as copying, scanning, and faxing, the state display information may include information indicating whether all functions of the multi-functional apparatus can be performed in an optimal state, whether each function of the apparatus such as copying, scanning, or faxing can be performed in an optimal state, which function is frequently used by a user, or how many articles or how much materials, such as paper or ink, is/are left in the apparatus to perform a particular function. For example, when the ink used by the apparatus is color ink, the state display information may be displayed to inform the remaining amount of ink for each color.

The state display information processing portion 100 includes a state detection portion 101 and a state display information generation portion 103 to generate the state display information. The state detection portion 101 detects a change in the state of the apparatus. That is, the state detection portion 101 detects the state of constituent elements included in the apparatus, the capability of functions of the apparatus, or the remaining degree of material or articles needed for the apparatus to perform the functions. When a user requests the performance of a particular function through the user interface 110, the state detection portion 101 accumulates the number of requests for the particular function by the user, and detects a function that is frequently used by the user. The state display information generation portion 103 generates the state display information using a change in the state of the apparatus detected by the state detection portion 101. The state display information generation portion 103 generates the state display information so that the user can intuitively or suggestively recognize the state of the apparatus. The state display information may be generated when the user requests the performance of a function using the user interface 110 or the user separately requests the generation of the state display information. Also, the state display information may be generated without a user's request when there is a change in the state of the apparatus. The generated state display information may be displayed on the user interface 110, the output portion 150, or an output portion (not shown) that outputs only the state display information.

The user interface 110 receives commands, letters, numbers or voice information from the user and includes a physical transducer such as a keyboard, mouse, a touch pad, or a microphone. In an exemplary embodiment of the present invention, the user interface 110 includes a button used to request a particular function to the apparatus. Also, in an exemplary embodiment of the present invention, the user interface 110 can output the state display information of the apparatus.

The control portion 120 controls the general operation of the apparatus according to the user request through the user interface 110. Also, the control portion 120 controls the apparatus to generate and output state display information according to the present invention. The control portion 120 includes an Arithmetic Logic Unit (ALU) for performing calculations and a register for temporarily storing data and commands.

The memory portion 130 stores programs needed to perform various functions of the apparatus or generate the state display information according to an aspect of the present invention and includes a high speed main memory of a storage medium type such as a (Random Access Memory) (RAM) or a Read Only Memory (ROM); an auxiliary memory of a long-term storage medium type such as a floppy disk, a hard disk, a tape, a CD-ROM, or a flash memory; and an apparatus for storing data using electricity, magnetism, optics, or other storage media. In an exemplary embodiment, the memory portion 130 may generate, in advance, the state display information or store the state display information by obtaining the state display information from other media. In this case, the state display information generation portion 103 may generate the state display information by extracting state display information corresponding to a change in the state of the apparatus of the state display information previously stored in the memory portion 130.

The function processing portion 140 performs various functions according to the type of the apparatus. For example, when the type of the apparatus is a cellular phone, the function processing portion 140 may perform a wireless communication function. For MP3 players, the function processing portion 140 can reproduce a media signal. For multi-functional devices, the function processing portion 140 performs copying, scanning, or fax transmission according to the control of a user.

The output portion 150 outputs a result according to the function requested by the user through a screen or a speaker. The output portion 150 may include, but is not limited to, a display portion (not shown) which outputs video signals, a speaker (not shown) which outputs audio signals, and/or an OSD processing portion (not shown) which generates and outputs an apparatus control list. When the apparatus is a multi-functional device, the output portion 150 may output copying or scanning results.

Figure 2:
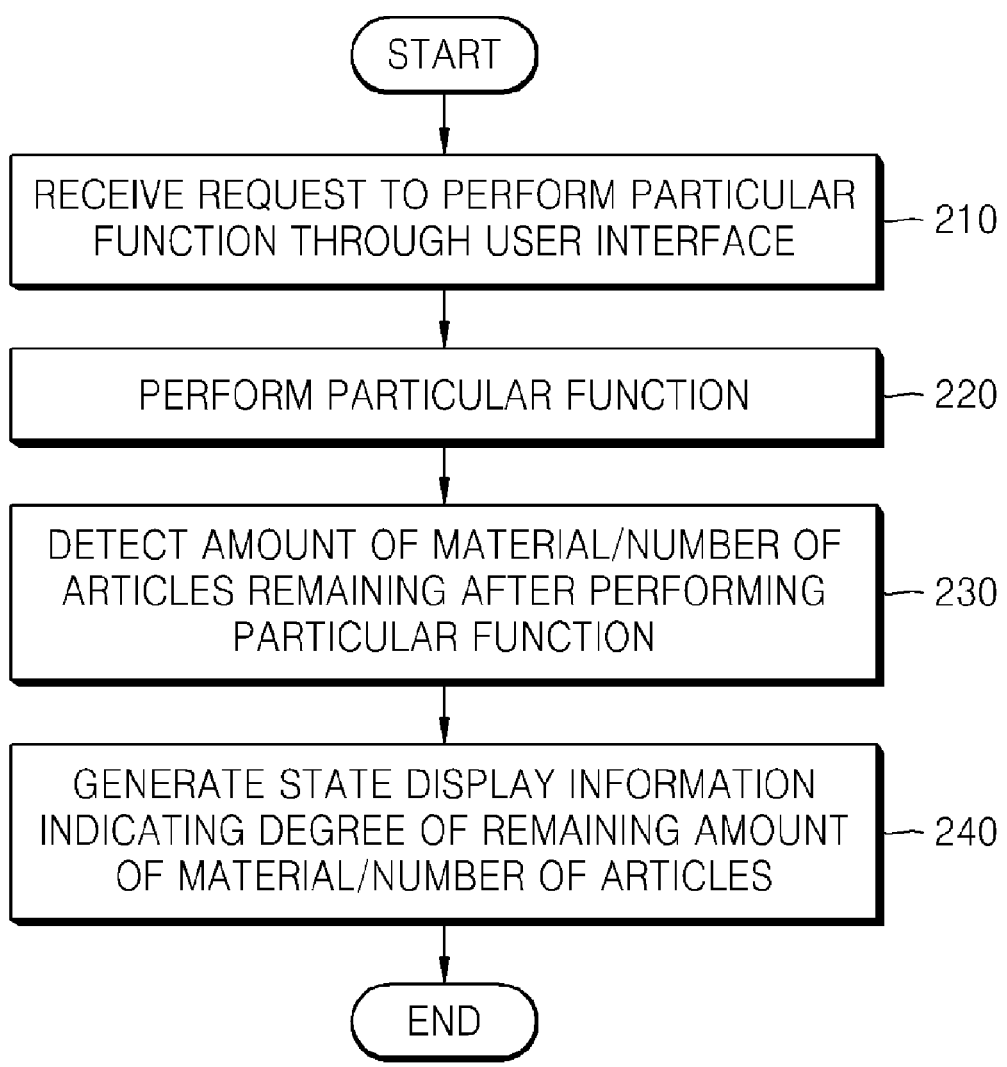
FIG. 2 is a flowchart of a state apparatus information generation method according to an exemplary embodiment of the present invention.

FIG. 2 is a flowchart of a state display information generation method according to an exemplary embodiment of the present invention. Referring to FIG. 2, the apparatus of FIG. 1 receives a request to perform a particular function through the user interface 110 from the user (Operation 210). The control portion 120 issues a command to perform the function to the function processing portion 140 in response to the user request. Thus, the function processing portion 140 performs the function requested by the user according to the command of the control portion 120 (Operation 220). The state detection portion 101 detects a change in the state of the apparatus according to the performance of the function by the function processing portion 140. The state detection portion 101 may detect the amount of material or the number of articles remaining after consumption for the performance of the function requested by the user (Operation 230). The state detection portion 101 sends information indicating the remaining amount of material or number of articles to the state display information generation portion 103. The state display information generation portion 103 generates state display information indicating the remaining amount of material or number of articles by using the information about the state change received from the state detection portion 101 (Operation 240).

When the state display information is already stored in the memory portion 130, the state display information generation portion 103 generates state display information by extracting state display information corresponding to the amount of material or number of articles remaining from the state display information already stored in the memory portion 130. The state display information generation portion 103 may express the remaining amount of material in detail and in an intuitive, sensitive or humorous manner. For example, when a user requests the performance of a copy function in the multi-functional device, the state detection portion 101 detects the number of paper sheets or the amount of ink remaining after consumption for the copy function performed by the function processing portion 140. The state display information generation portion 103 may generate state display information indicating the remaining number of paper sheets after consumption in a detailed form or indirectly using a metaphorical indicator. The method of generating state display information using a metaphorical indicator will be described later with reference to FIGS. 4 through 6. The state display information generation portion 103 may output the generated state display information through the OSD processing portion included in the output portion 150, the user interface 110, or by using a separate button indicating the state display information.

Figure 3:
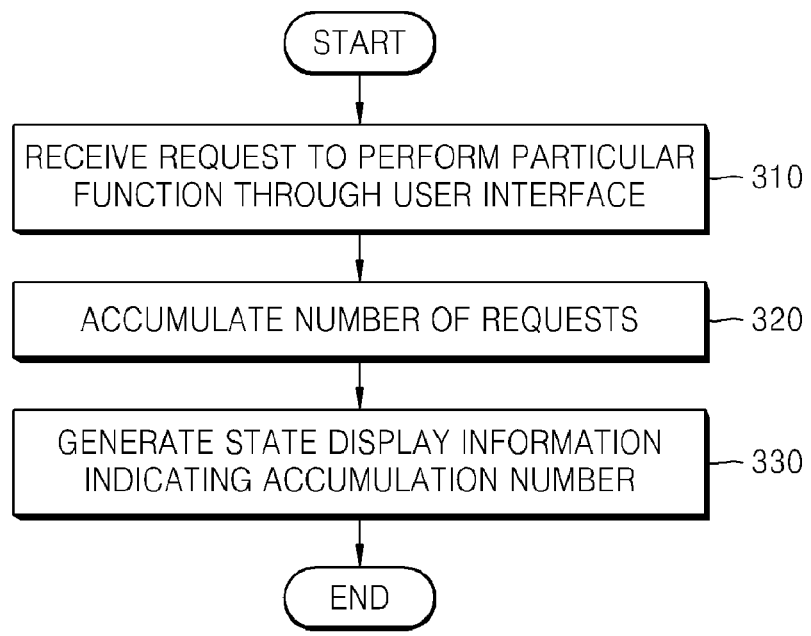
FIG. 3 is a flowchart for explaining a state display information generation method according to an exemplary embodiment of the present invention.

FIG. 3 is a flowchart explaining a state display information generation method according to an exemplary embodiment of the present invention. Referring to FIG. 3, an apparatus receives a user request through the user interface 110 to perform a particular function (Operation 310). The state detection portion 101 detects the user request to perform the function and accumulates the number of user requests to perform the particular function (Operation 320). When the apparatus has a plurality of functions, the state detection portion 101 may accumulate the number of requests for each of the functions by the user. The state detection portion 101 sends the accumulation number to the state display information generation portion 103. The state display information generation portion 103 generates state display information using the number of function performance requests accumulated in the state detection portion 101 (Operation 330).

The state display information generation portion 103 assigns an order to the function performance requests made by the user for each of the functions that can be performed by the apparatus according to the frequencies of requests, i.e., the number of times requests are made and generates state display information indicating the order. When the apparatus is a multi-functional device, the state display information generation portion 103 can generate state display information indicating the number of function performance requests by the user for each of the functions such as a fax, a scan, and a copy function. When a plurality of user interfaces are included in the multi-functional device and the user requests each particular function performance through each of the user interfaces, the state display information generation portion 103 can output state display information indicating a function performance number to a user interface used for requesting a function that the user frequently uses and a user interface used for requesting a function that the user does not use much.

Figure 4:
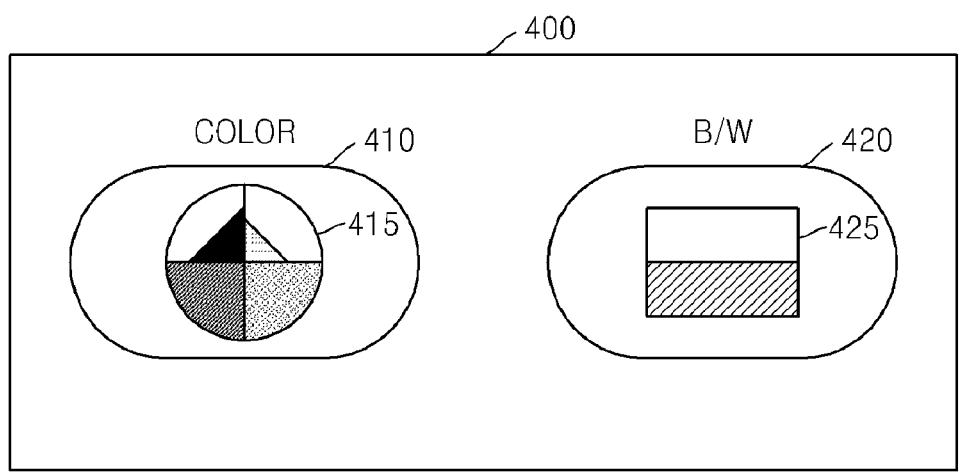
FIG. 4 illustrates state display information according to an exemplary embodiment of the present invention.

FIG. 4 illustrates state display information according to an exemplary embodiment of the present invention. Referring to FIG. 4, a screen 400 of a multi-functional device includes a pair of buttons 410 and 420. The screen 400 of the multi-functional device is included in the output portion 150 of the apparatus and the buttons 410 and 420 are included in the user interface 110 provided in the apparatus. Although in FIG. 4 the buttons 410 and 420 are used as the user interface 110, the present invention is not limited thereto and the user interface 110 may include a keyboard, a mouse, a touch pad, a touch screen, or a microphone that can receive a command from the user. Each of the buttons 410 and 420 is used to request a particular function of the apparatus. When the apparatus can copy in color or in black and white, the user can select a color or black and white copy function using the buttons 410 and 420 included in the screen 400, respectively. When the user requests the color or black and white copy function using the buttons 410 and 420, respectively, the function processing portion 140 performs the function requested by the user according to the command of the control portion 120. The state detection portion 101 detects ink or paper consumed as the function processing portion 140 performs the copy function and the amount of remaining ink or the number of remaining paper sheets. When the ink is color ink, the state detection portion 101 can detect the amount of remaining ink for each color. The state detection portion 101 sends the detected amount of remaining ink to the state display information generation portion 103. The state display information generation portion 103 generates state display information indicating the amount of ink for each color, and outputs the state display information to the button 410.

In FIG. 4, the buttons 410 and 420 may display the amount of remaining ink. When the ink is color ink, the amount of remaining ink for each color is displayed. The user can recognize a degree of performance of a color or black and white copy function that the apparatus can perform by using state display information 415 and 425 output to the buttons 410 and 420, respectively. Also, the user can detect whether ink is sufficient or which color of ink is insufficient based on the state display information 415 and 425.

Figure 5:
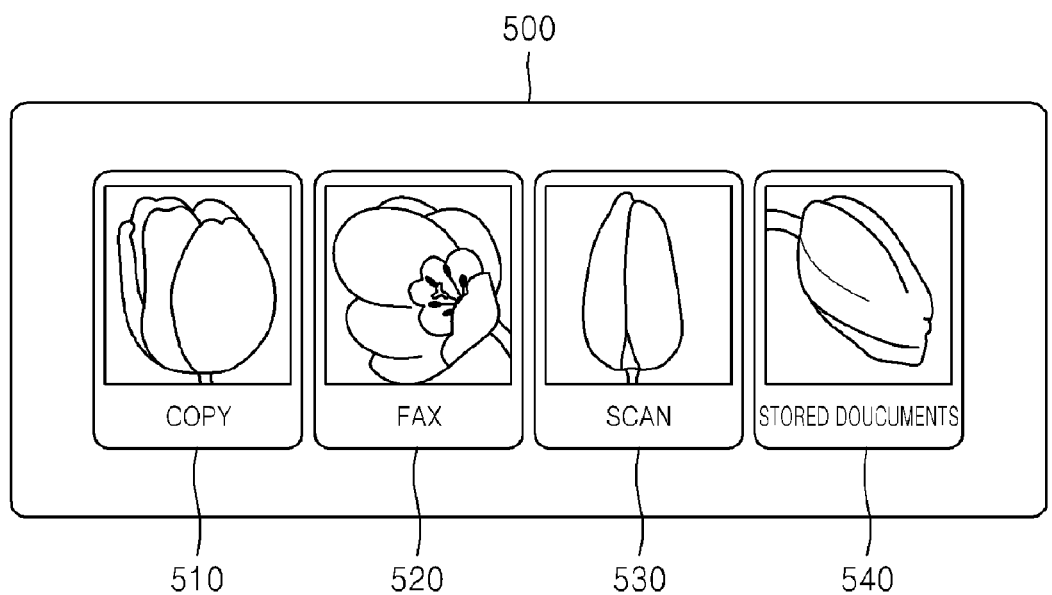
FIG. 5 illustrates state display information according to an exemplary embodiment of the present invention.

FIG. 5 illustrates a display displaying state display information according to an exemplary embodiment of the present invention. Referring to FIG. 5, a screen 500 of an apparatus includes a plurality of user interfaces 510 through 540 through which particular functions that can be performed by the apparatus can be requested. In FIG. 5, the user interfaces 510 through 540 may be buttons or touch pads. A user is able to request the performance of particular functions to the apparatus by using the user interfaces 510 through 540. The state detection portion 101 accumulates the number of requests for performing each particular function using the respective user interfaces 510 through 540. The state detection portion 101 sends the accumulated number of requests for performing each particular function to the state display information generation portion 103. The state display information generation portion 103 generates state display information indicating which function is more used by using the accumulated number and outputs the state display information to the user interfaces 510 through 540. The apparatus can output the state display information by outputting the number obtained by accumulating the number of requests for performing a particular function from the user directly to the user interfaces 510 through 540.

As shown in FIG. 5, the state display information can be displayed using a flower as a metaphorical indicator. When the user mostly uses a fax function, the state display information of a blossoming flower is output to the user interface 520, which is used to request the performance of a fax function. In an exemplary embodiment where the user infrequently uses the user interface 540 to request a performance of a stored documents function, the state display information is output as a group of flower buds or a drooping flower. The user can intuitively recognize the frequency of performing a particular function by seeing a degree of blooming of a flower.

Figure 6:
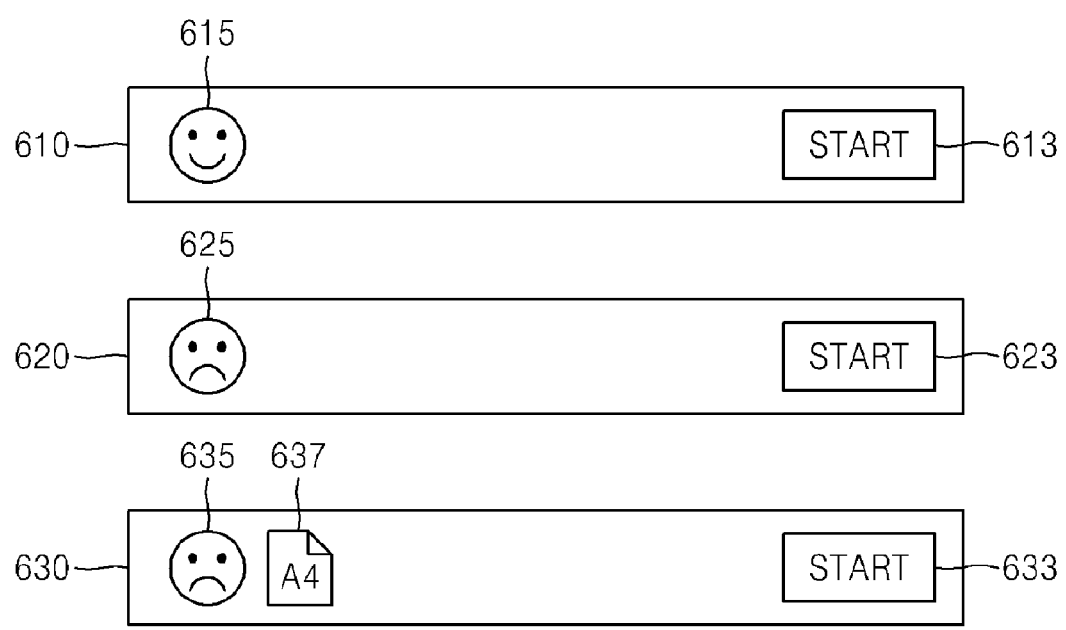
FIG. 6 illustrates state display information according to an exemplary embodiment of the present invention.

FIG. 6 illustrates state display information according to an exemplary embodiment of the present invention. Referring to FIG. 6, an apparatus outputs state display information 615, 625, 635, and 637. The apparatus can output state display information 615, 625, 635, and 637 to user interfaces 613, 623, and 633 or a separate screen. The state display information 615, 625, 635, and 637 can be embodied in a variety of methods using, but not limited to, different colors, shapes, or sizes. The state display information indicating the order of the frequency of performing a function or a status regarding the amount of material remaining after the performance of a function may be output using the change in the brightness, transparency, or contrast of a color. In FIG. 6, the state display information may be output from the state display information 615 in the form of a smile face emotion icon to the state display information 635 in the form of a crying or frowning face emotion icon according to the order of frequency of performing the functions or a degree of a particular function performance capability. When the amount of a particular article is not sufficient to perform a particular function, the state display information generation portion 103 generates the state display information 637 indicating the particular article is insufficient. For example, when paper pf size A4 is insufficient, the state display information generation portion 103 outputs the generated state display information to a screen 630 with a frowning face emotion icon 635. Thus, the user can easily and pleasantly recognize through the state display information which article is insufficient in terms of amount, which function is frequently used, and a generation state of an apparatus or a particular function performance capability state.

According to the exemplary embodiments of the present invention, a state display method by which the state of an apparatus can be recognized without a separate job by displaying the state of the apparatus on the apparatus and an apparatus for performing the method. Also, according to the exemplary embodiments of the present invention, a state display method in which a user interface may perform a function of displaying apparatus state display information in addition to a function of delivering a user's command by displaying the state of the apparatus in the user interface and an apparatus for performing the method.

What is claimed is:

1. A method of displaying a state of an apparatus having a plurality of user interfaces, the method comprising:
 generating state display information indicating the state of the apparatus; and
 displaying the state display information via the plurality of user interfaces wherein the state display information indicates the state of the apparatus through a metaphorical indicator,
 wherein a request to perform a particular function is made through each of the plurality of user interfaces, and
 wherein the generating the state display information comprises:
  receiving the request to perform the particular function through each of the plurality of user interfaces;
  accumulating a number of requests to perform the particular function;
  assigning a display order to each of the plurality of user interfaces according to the accumulated number of requests by comparing the accumulated number of requests with an accumulation number to perform another function; and
  generating the state display information including the plurality of user interfaces displayed according to the assigned order.

2. The method of claim 1, wherein each of the plurality of user interfaces comprises a button.

3. The method of claim 1, wherein the state display information of the apparatus comprises at least one of:
 information indicating a general state of the apparatus;
 a possibility of performing a particular function by the apparatus; and
 information indicating an amount of material or a number of articles remaining to perform the particular function by the apparatus.

4. The method of claim 3, wherein the material or the articles comprise at least one of paper and ink.

5. The method of claim 1, wherein the generating the state display information comprises:
 receiving a request to perform a particular function through one of the plurality of user interfaces;
 performing the particular function in response to the request;
 detecting an amount of material or a number of articles remaining after the particular function is performed; and
 generating the state display information indicating a degree of the amount of material or the number of articles in response to the detection.

6. The method of claim 5, wherein the material comprises or the articles comprise at least one of paper and ink.

7. The method of claim 5, wherein the generating the state display information further comprises:
 extracting the state display information corresponding to the amount of material or the number of articles that is detected among state display information that is already stored.

8. The method of claim 5, wherein the generating the state display information further comprises:
 generating the state display information indicating the degree of the amount of material or the number of articles remaining after the particular function is performed, if an amount of material or a number of articles that is consumed to perform the particular function is plural.

9. The method of claim 1, wherein the generating the state display information indicating the accumulated number of requests comprises extracting state display information corresponding to the accumulated number of requests to perform the particular function among state display information that is already stored.

10. An apparatus for displaying a state of the apparatus comprising:
 a state display information processing portion which generates state display information; and
 a plurality of user interfaces which receive a request to perform a particular function and which output the state display information of the apparatus,
 wherein the plurality of user interfaces are displayed on the apparatus according to a frequency of use of the particular function, and wherein the state display information indicates the state of the apparatus through a metaphorical indicator.

11. The apparatus of claim 10, wherein each of the plurality of user interfaces comprises a button.

12. The apparatus of claim 10, wherein the state display information comprises at least one of:
 information which indicates a general state of the apparatus;

a possibility of performing a particular function by the apparatus; and information which indicates an amount of material or a number of articles remaining to perform the particular function by the apparatus.

13. The apparatus of claim 12, wherein the material comprises or the articles comprise at least one of paper and ink.

14. The apparatus of claim 10, wherein the state display information processing portion comprises:

a state detection portion which detects a change in the state of the apparatus; and a state display information generation portion which generates the state display information which corresponds to the change in the state of the apparatus.

15. The apparatus of claim 10, wherein each of the plurality of user interfaces receives a request to perform the particular function and the state display information processing portion comprises:

a state detection portion which detects an amount of material or a number of articles remaining after performing the particular function; and a state display information generation portion which generates state display information which indicates a degree of the amount of material or the number of articles.

16. The apparatus of claim 15, wherein the material comprises or the articles comprise at least one of paper and ink.

17. The apparatus of claim 15, wherein the state display information processing portion further comprises:

a state display information storing portion which stores the state display information;

the state display information generation portion which extracts the state display information which corresponds to the amount of material or the number of articles detected by the detection portion among the state display information stored in the state display information storing portion.

18. The apparatus of claim 15, wherein, if plural types of materials or articles are used to perform the particular function, the state display information generation portion generates state display information indicating a degree of the amount of each of the types of the materials or the number of each of the articles remaining after performing the particular function.

19. The apparatus of claim 10, wherein each of the plurality of user interfaces receives a request to perform the particular function and the state display information processing portion comprises:

a state detection portion which accumulates a number of requests to perform the particular function made through each of the plurality of user interfaces; and a state display information generation portion which generates the state display information which indicates the accumulated number of requests.

20. The apparatus of claim 19, wherein the state display information processing portion further comprises:

a state display information storing portion which stores the state display information; and the state display information generation portion extracts state display information which corresponds to the number of requests to perform the particular function detected by the detection portion among the state display information stored in the state display information storing portion.

* * * * *